(12) United States Patent
Zhang et al.

(10) Patent No.: US 8,391,688 B2
(45) Date of Patent: Mar. 5, 2013

(54) SMOOTH REWIND MEDIA PLAYBACK

(75) Inventors: Wenbo Zhang, Redmond, WA (US); Yongjun Wu, Bellevue, WA (US); Kim-chyan Gan, Sammamish, WA (US); Eric Christoffersen, Beaux Arts, WA (US)

(73) Assignee: Microsoft Corporation, Redmond, WA (US)

( * ) Notice: Subject to any disclaimer, the term of this patent is extended or adjusted under 35 U.S.C. 154(b) by 255 days.

(21) Appl. No.: 13/008,797

(22) Filed: Jan. 18, 2011

(65) Prior Publication Data

US 2012/0093489 A1 Apr. 19, 2012

Related U.S. Application Data

(60) Provisional application No. 61/394,280, filed on Oct. 18, 2010.

(51) Int. Cl.
*H04N 5/92* (2006.01)
(52) U.S. Cl. ...................................................... 386/347
(58) Field of Classification Search .................. 386/200, 386/347
See application file for complete search history.

(56) References Cited

U.S. PATENT DOCUMENTS

| | | | |
|---|---|---|---|
| 6,473,558 B1 * | 10/2002 | Wu et al. ........................ | 386/290 |
| 7,826,718 B2 | 11/2010 | Walls et al. | |
| 2005/0025456 A1 | 2/2005 | Halfant | |
| 2008/0273858 A1 | 11/2008 | Wald et al. | |
| 2010/0166079 A1 | 7/2010 | Goel | |

OTHER PUBLICATIONS

Wee, et al., "Compressed-Domain Reverse Play of MPEG Video Streams", Retrieved at << http://citeseerx.ist.psu.edu/viewdoc/download?doi=10.1.1.23.8431&rep=rep1&type=pdf >>, SPIE International Symposium on Voice, Video and Data Communications, Nov. 1998, pp. 12.

Shenoy, et al., "Efficient Support for Scan Operations in Video Servers", Retrieved at << http://citeseerx.ist.psu.edu/viewdoc/download-?doi=10.1.1.51.7272&rep=rep1&type=pdf >>, 3rd International Conference on Multimedia, Nov. 5-9, 1995, pp. 1-17.

"Rewind Playback of Media", U.S. Appl. No. 12/025,536, filed Feb. 4, 2008, pp. 1-19.

"Media Streaming With Smooth Fast-Forward and Rewind", U.S. Appl. No. 12/326,839, filed Dec. 2, 2008, pp. 1-22.

"Virtual Playback Speed Modification", U.S. Appl. No. 12/795,672, filed Jun. 8, 2010, pp. 1-21.

* cited by examiner

*Primary Examiner* — Huy T Nguyen
(74) *Attorney, Agent, or Firm* — Alleman Hall McCoy Russell & Tuttle LLP

(57) ABSTRACT

Systems and methods for smooth rewind playback of streamed media are provided. The media includes relatively-encoded frames and independently-encoded frames. The method includes receiving a rewind request indicating a rewind speed for rewind playback of the media, selectively dropping relatively-encoded frame(s) based on a receipt constraint and a decoding constraint to form a subset of the media, and receiving frames of the subset. The method further includes selecting, in a reverse order, a selected group of pictures (GOP) included within the subset, and decoding relatively-encoded frame(s) of the GOP in a forward sequential frame order. The method further includes caching relatively-encoded frame(s) of the GOP in the forward sequential frame order, and when caching, dropping and overwriting relatively-encoded frame(s) of the GOP selectively according to a memory constraint and/or a display constraint. The method further includes displaying relatively-encoded frame(s) of the GOP in a reverse sequential frame order.

20 Claims, 2 Drawing Sheets

SMOOTH REWIND MEDIA PLAYBACK

CROSS REFERENCE TO RELATED APPLICATIONS

This application claims priority to U.S. Patent Application No. 61/394,280, filed Oct. 18, 2010, the entirety of which is hereby incorporated herein by reference.

BACKGROUND

Digital media may be compressed in order to reduce the quantity of data used to represent the media. Various techniques exist for performing such data compression by encoding the media into a smaller form. Accordingly, during playback, such compressed media is typically decoded before it is presented. As such, playback may be affected by the type of compression utilized, as well as the system resources available for decoding the media.

A common approach for encoding media includes defining frames relative to other frames. As an example, these frames may be defined as a difference (e.g., a delta) with respect to another frame or frames. This is because frames may change relatively little from one frame to a next, and thus, representing the frames based on the changes may utilize less data than representing the entire frame. However, such relative encoding of frames may complicate playback of the media, as this serial dependency must be taken into account when decoding the media. In particular, playback of such media within a trick mode such as fast-forwarding or rewinding may be particularly challenging since these trick modes typically require playback at an increased speed, and accordingly, may utilize more system resources to support the quicker decoding and display of the media. Moreover, international standards, such as H.264, VC-1, MPEG-2, MPEG-4 Part II, and MPEG-1, only define the decoding processing of normal playback, but not the decoding of any trick playback, which is left up to application designs.

Another existing approach is to decode all frames in a forward order, then playback the decoded frames in a reverse order. However, such an approach taxes conventional system resources, and thus reverse playback may be too slow to suit the user.

SUMMARY

Systems and methods of decoding media playback for smooth rewind playback of streamed media at a desired rewind speed are provided. The media includes a plurality of frames, the plurality of frames including a plurality of relatively-encoded frames, where a relative encoding for each relatively-encoded frame is dependent on one or more prior frames in the media, and the media further includes a plurality of independently-encoded frames spaced apart by predefined intervals of relatively-encoded frames. The method includes receiving a rewind request indicating a rewind speed for rewind playback of the media, selectively dropping one or more of the plurality of relatively-encoded frames of the media based on a receipt constraint of receiving the media and a decoding constraint of decoding the media to form a subset of the media, and receiving the one or more frames of the subset of the media. The method further includes selecting, in a reverse order, a selected group of pictures (GOP) of a plurality of GOP included within the subset of the media, where each GOP includes at least one independently-encoded frame and one or more relatively-encoded frames. The method further includes decoding each of the one or more relatively-encoded frames of the GOP in a forward sequential frame order. The method further includes caching each of the one or more relatively-encoded frames of the GOP in the forward sequential frame order, and when caching, dropping and overwriting one or more of the one or more relatively-encoded frames of the GOP selectively according to one or more of a memory constraint and a display constraint. The method further includes displaying each of the one or more relatively-encoded frames of the GOP in a reverse sequential frame order, where the reverse sequential frame order is opposite of the forward sequential frame order.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As introduced above, it may be challenging to enable trick modes such as fast-forwarding or rewinding for compressed media, since these modes typically require that the media be presented at a perceptually faster rate. In particular regard to media compressed via relative encoding, since frames within the media are temporally-ordered, the relatively-encoded frames may be serially dependent on previous frames. As such, these relative dependencies must be taken into account when decoding the media, as the decoding of a particular frame may depend on one or more other frames being decoded first.

Typically, a smooth fast-forward may be enabled, for example, by quickly decoding the frames and periodically purging some frames, such that the display of the decoded frames may still be perceived by a viewer as relatively smooth. However, this is not necessarily the case for a rewind mode. It may be particularly challenging to enable smooth rewinding since frames are displayed in a reverse order, yet the relative-encoding of such frames may depend on prior frames not yet displayed, and thus, not yet decoded. Thus, one existing approach to rewinding relatively-encoded media includes displaying just the frames which are independently-encoded, since the decoding of such frames is not dependent on the decoding of other frames. However, the independently-encoded frames may be spaced apart within the media at such a temporal difference (e.g., at least 0.5 seconds, up to a few seconds such as 2-8 seconds), causing playback in a rewind mode to be perceived by the viewer as relatively disjointed. Another existing approach is to decode all frames in a forward order, then playback the decoded frames in a reverse order. However, typically system resources cannot provide such playback at a perceptually faster rate than forward playback.

Therefore, embodiments are disclosed herein that relate to smooth rewind playback, wherein a perceptually smooth playback of relatively-encoded media is provided by first selectively dropping frames of the media stream and/or switching to a lower complexity stream to ensure that frames may be obtained and decoded within system constraints. Further, decoded frames may be selectively dropped during caching to comply with memory constraints, as described in more detail as follows. In this way, a user may be afforded a better rewind experience as the rewinding of the media may appear fast and visually continuous, akin to a rewind experience typically associated with rewinding of a traditional video tape.

Figure 1:
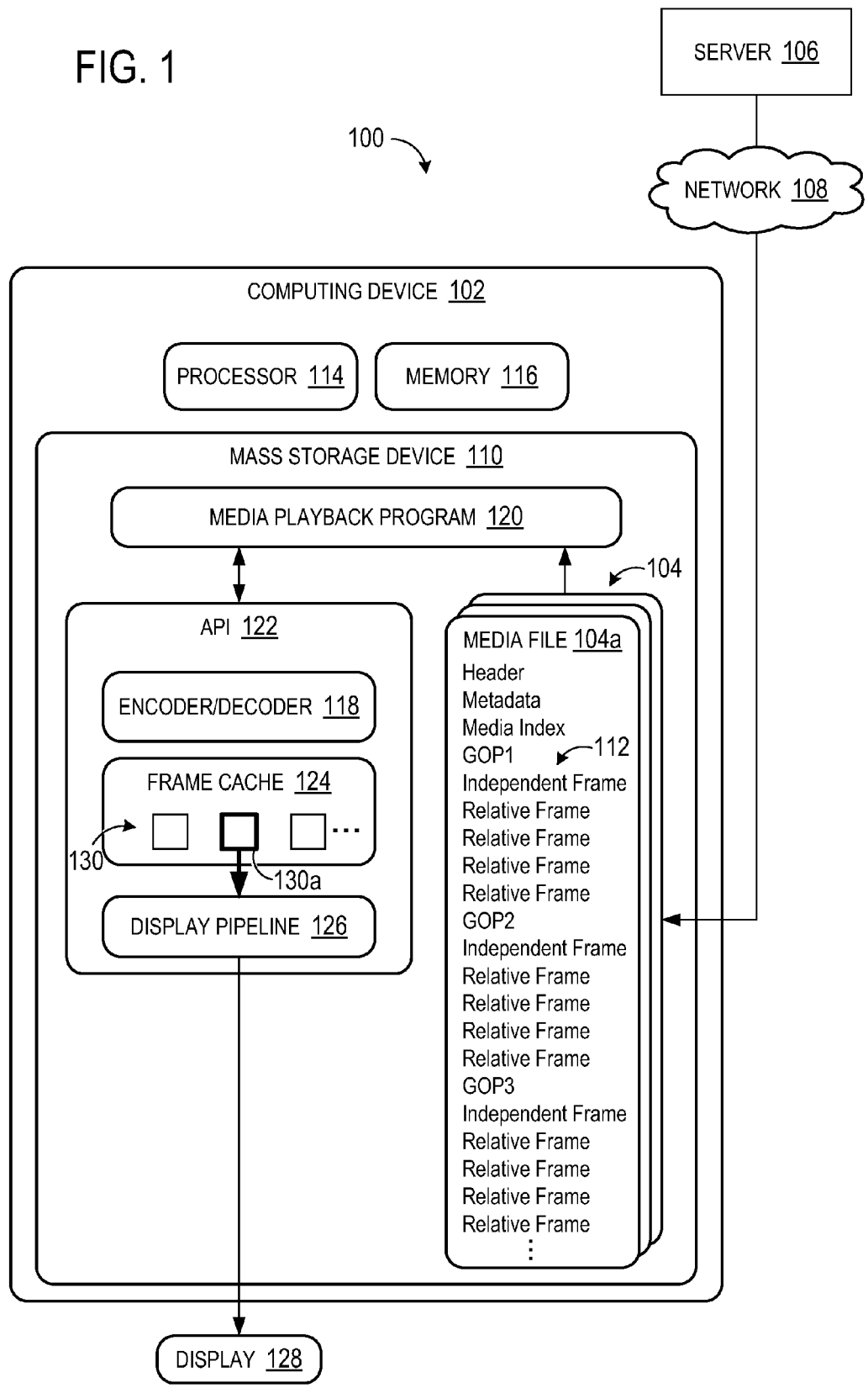
FIG. 1 shows an example computing device in accordance with an embodiment of the present disclosure.

FIG. 1 illustrates a media playback environment 100 including a computing device 102 configured to playback media, such as relatively-encoded media 104. It should be appreciated that computing device 102 is shown in simplified form. It is to be understood that virtually any computer architecture may be used without departing from the scope of this disclosure. In different embodiments, computing device 102 may take the form of a mainframe computer, server computer, desktop computer, laptop computer, tablet computer, home entertainment computer, network computing device, mobile computing device, mobile communication device, gaming device, etc.

In some embodiments, media 104 may streamed by a server 106 via a network 108. Such a server 106 may, for example, include one or more server devices communicatively coupled to the computing device 102 by a computer network, so as to stream media 104. Accordingly, in such embodiments, computing device 102 may be configured to communicate with server 106, to request and receive streaming media 104 from the server 106. Computing device 102 may do so in any suitable manner, and may include wired and/or wireless communication devices compatible with one or more different communication protocols. As nonlimiting examples, computing device 102 may be configured for communication via a wireless telephone network, a wireless local area network, a wired local area network, a wireless wide area network, a wired wide area network, etc. In some embodiments, computing device 102 may be configured to send and/or receive messages to and/or from other devices via a network such as the Internet.

However, in other embodiments, media 104 may be stored locally at computing device 102, such as in a mass storage device 110. Mass storage device 110 may include one or more physical, non-transitory, devices configured to hold data and/or instructions executable by the processor to implement the herein-described methods and processes. When such methods and processes are implemented, the state of mass storage device 110 may be transformed (e.g., to hold different data). Further, mass storage device 110 may include removable media and/or built-in devices. Mass storage device 110 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Mass storage device 110 may include devices with one or more of the following characteristics: volatile, nonvolatile, dynamic, static, read/write, read-only, random access, sequential access, location addressable, file addressable, and content addressable.

It should be appreciated that in some embodiments, multiple streams of media 104 may be available to computing device 102, such as different streams having different levels of complexity (e.g., different bitrates, different resolutions, etc.).

Continuing with FIG. 1, media 104 may be relatively-encoded in any suitable way. For example, media 104 may include a plurality of frames, some of which are independently-encoded, and thus do not require any other picture data when being decoded, and others which are relatively-encoded. The relative encoding for each relatively-encoded frame may be dependent on one or more prior frames in the media. These prior frames may be independently-encoded or relatively-encoded. Further, the independently-encoded frames may be spaced apart by predefined intervals of relatively-encoded frames. As a nonlimiting example, an independently-encoded frame may be an I-frame. With regard to relatively-encoded frames, as a nonlimiting example, a predictive frame (e.g., a P-frame, delta-frame, etc.) may be relatively encoded with respect to a previous frame, and may be represented by changes in the image from the previous frame. As such, storage space is not wasted on data which has not changed from frame to frame, such as background data. As another nonlimiting example, a bi-predictive frame (e.g., B-frame) may save even more storage space by being relatively encoded with respect to a preceding frame and following frame(s).

It should be appreciated that any suitable dependence relationship may be utilized for relatively encoding the relatively-encoded frames, and further, that this relationship may vary from frame to frame. Further, such a relationship may define the intervals of relatively-encoded frames by which the successive independently-encoded frames are spaced. As a nonlimiting example, independently-encoded frames may be spaced apart by as little as 0.5 second, or as much as a few seconds (e.g., 2-8 seconds), wherein larger spacing yields better compression of the media.

In some embodiments, this spacing may be selected to support a desired "seeking" feature of playback which seeks to a next independently-encoded frame. As an example, a portion of the media may include a beginning frame which is independently-encoded, followed by several relatively-encoded frames. In such a case, playback may have difficulty in supporting seeking to the middle of this portion of the media, since in order to seek to the frame in the middle, all the preceding frames starting from the nearest independently-encoded frame need to be received and decoded, in general. As such, to support fast seeking, a smaller spacing between independently-encoded frames may be selected. However, such smaller spacing between independently-encoded frames may be at a detriment to the compression efficiency of the media.

As briefly introduced above, rewinding of such a relatively-encoded media stream via traditional rewinding (e.g., which displays independently-encoded frames in a reverse order) may appear disjointed to a viewer, since the independently-encoded frames are spaced apart. Further, decoding each and every frame in a forward order and then displaying the frames in a reverse order may appear smoother to the viewer, however, such processing may be time-intensive, and thus may not be displayable at the desired rewind speed. Thus, computing device 102 is configured to perform smooth rewinding of media 104 by selectively thinning the stream, as well as decoding and displaying relatively-encoded frames of the thinned stream, as described in more detail with reference to FIG. 2.

Frames within media 104 may be further grouped into groupings called a Group of Pictures (GOP). Each GOP may include at least one independently-encoded frame and one or more relatively-encoded frames. As illustrated in FIG. 1 at 112, an example media file 104a includes several GOP, each GOP including independently-encoded and relatively-encoded frames. Example media file 104a may include additional data, such as a header, metadata, a media index, etc. It should be appreciated that example media file 104a is illustrative, and thus may include additional and/or alternative elements not shown in FIG. 1 without departing from the scope of this disclosure.

Computing device 102 may be configured to playback media 104 using an encoder/decoder 118, for example. In such an embodiment, computing device 102 may include instructions, for example stored at mass storage device 110 and executable via processor 114 and memory 116, which utilize encoder/decoder 118 to perform encoding and decoding functions on media 104. Such encoding and decoding functions may be performed to support traditional playback of media 104, as well as trick mode playback such as fast-forwarding, rewinding, etc. including the herein-described embodiments of smooth rewind playback.

Processor 114 may include one or more physical devices configured to execute one or more instructions. For example, the processor may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result. Further, the processor may include one or more processing devices that are configured to execute software instructions. Additionally or alternatively, the processor may include one or more hardware or firmware logic machines configured to execute hardware or firmware instructions. Processing devices of the processor may be single core or multicore, and the programs executed thereon may be configured for parallel or distributed processing. The processor may optionally include individual components that are distributed throughout two or more devices, which may be remotely located and/or configured for coordinated processing. One or more aspects of the processor may be virtualized and executed by remotely accessible networked computing devices configured in a cloud computing configuration. Further, in some embodiments, processor 114 and mass storage device 110 may be integrated into one or more common devices, such as an application specific integrated circuit or a system on a chip.

With regard to encoder/decoder 118, in some embodiments, encoder/decoder 118 may be included within a stand-alone media playback program such as example media playback program 120. It should be appreciated that the term "program" may be used herein to describe an aspect of computing device 102 that is implemented to perform one or more particular functions. In some cases, such a program may be instantiated via processor 114 and memory 116 executing instructions held by mass storage device 110. It is to be understood that different modules, programs, and/or engines may be instantiated from the same application, service, code block, object, library, routine, application programming interface (API), function, etc. Likewise, the same module, program, and/or engine may be instantiated by different applications, services, code blocks, objects, routines, APIs, functions, etc. The term "program" is meant to encompass individual or groups of executable files, data files, libraries, drivers, scripts, database records, etc.

However, in other embodiments, encoder/decoder 118 may be implemented via an API such as example API 122. It should be appreciated that encoder/decoder 118 may be implemented in yet other configurations within computing device 102 without departing from the scope of this disclosure.

Upon decoding frames of the media, encoder/decoder 118 may intermediately store decoded frames of media 104 in a frame cache 124 before sending the decoded frames to a display pipeline 126 for visual presentation at a display 128. Display 128 may be used to present a visual representation of data held by mass storage device 110. As the herein-described methods and processes change the data held by the mass storage device, and thus transform the state of the mass storage device, the state of display 128 may likewise be transformed to visually represent changes in the underlying data. Display 128 may include one or more display devices utilizing virtually any type of technology. Such display devices may be combined with processor 114, memory 116 and/or mass storage device 110 in a shared enclosure, or such display devices may be peripheral display devices.

As will be described in more detail hereafter with reference to FIG. 2, computing device 102 may be configured to perform smooth rewinding by first thinning the stream to support a desired rewind speed, selecting a next GOP of the media in a reverse GOP order (i.e., select a most recent GOP first), and decoding the frames within that GOP with encoder/decoder 118 and caching the frames in frame cache 124 in a forward sequential frame order. While caching, computing device 102 may further thin the stream based on a memory constraint, and then send the remaining decoded frames to display pipeline 126 for display at display 128 in a reverse sequential frame order.

Figure 2:
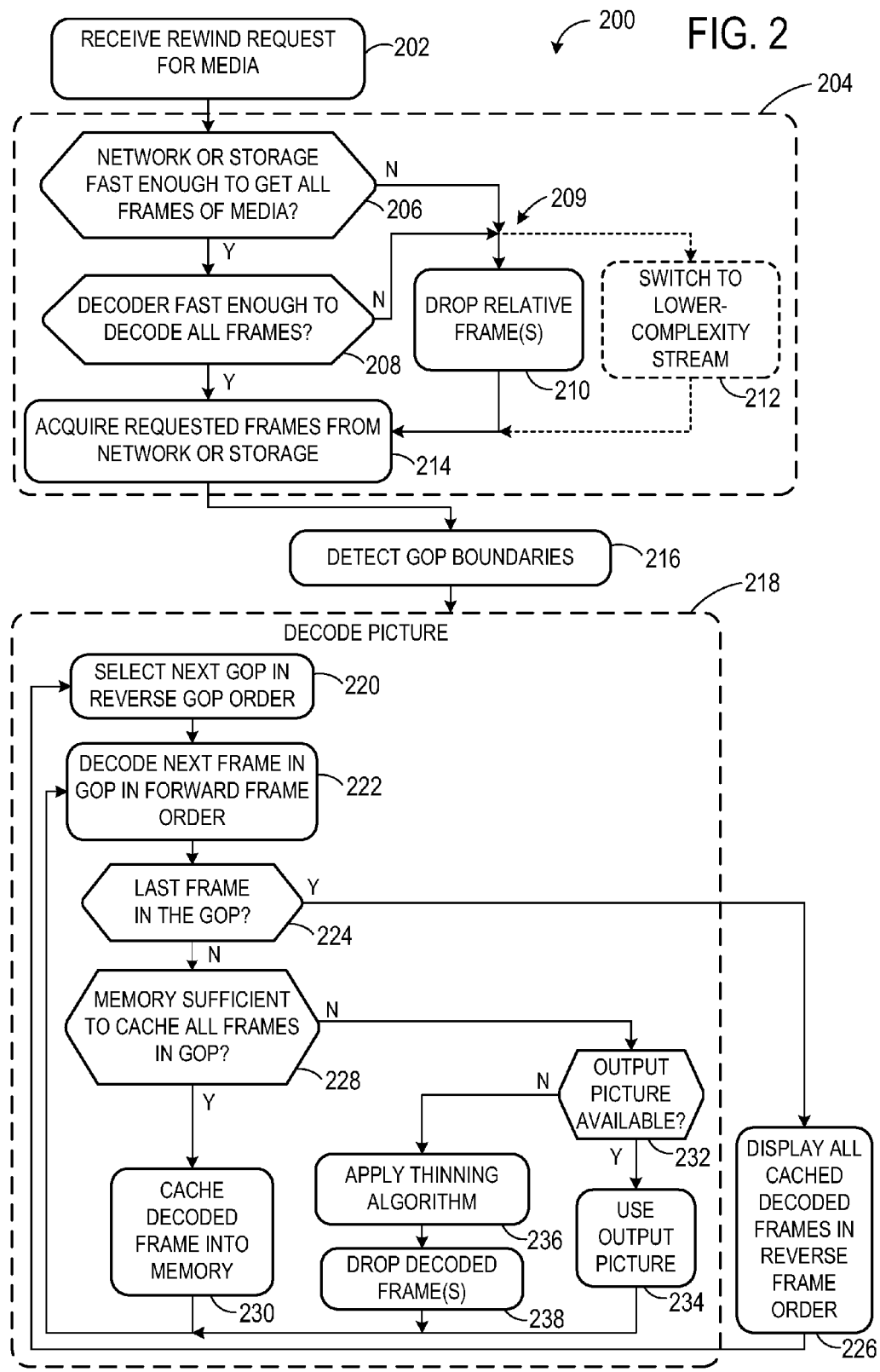
FIG. 2 shows a flow diagram of an example method of decoding media playback for smooth rewind playback of streamed media at a desired rewind speed in accordance with an embodiment of the present disclosure.

FIG. 2 shows an example flow diagram of a method 200 of decoding media playback for smooth rewind playback of streamed media at a desired rewind speed. At 202, a rewind request for the media (e.g., media file 104a of FIG. 1) is received by the computing device (e.g., computing device 102). Such a rewind request may be responsive to user selection to rewind the media. For example, a user may select a rewind button (e.g., on a remote control, another suitable input device, the computing device, etc.) and a corresponding rewind request may then be received at the computing device (e.g., at media playback program 120). The rewind request may indicate a desired speed at which the media is to be played back in reverse (e.g., a rewind speed). As a nonlimiting example, when selecting the rewind command, a user may select a desired speed for rewinding, such as twice as fast as normal playback.

It should be appreciated that various constraints may affect the computing device's ability to perform smooth rewind at the desired rewind speed. Accordingly, method 200 next proceeds to 204, where it is determined whether or not the computing device has the system resources to perform playback at the desired rewind speed, based on various performance thresholds dictated by the rewind speed, for example. In particular, one or more frames of the media may be selectively dropped based on constraints such as a receipt constraint of receiving the media and a decoding constraint of decoding the media. In this way, a subset of the stream may be formed which has fewer frames than the original stream, and these frames may be obtained and decoded fast enough to support the desired rewind speed.

It should be appreciated that the determination(s) at 204 may be implemented in any suitable manner, and thus, FIG. 2 is illustrative and not meant to be limiting. As an example, in some embodiments, method 200 may proceed to 206, where it is determined whether or not the media source (e.g., network 108 or mass storage device 110) is sufficiently fast to allow the computing device to obtain all of the frames of the media at a speed which supports the desired rewind speed. As such, the desired rewind speed may dictate a receipt constraint which the computing system must have the resources to meet, such as a particular speed at which the computing system reads from disk or network. As nonlimiting examples, the receipt constraint associated with a desired rewind speed may dictate one or more threshold performance values such as a threshold network performance value, a threshold storage performance value, a threshold memory value, a threshold bandwidth value, etc.

If all of the frames of the media may be obtained fast enough to support playback at the request rewind speed, then method 200 proceeds to 208, where it is determined if the decoder (e.g., encoder/decoder 118) is sufficiently fast so as to allow the computing device to decode all of the frames at a speed which supports the desired rewind speed. Accordingly, the desired rewind speed may further dictate a decoder constraint which the computing system must have the resources to meet, such as a particular speed at which the computing system decodes the frames. As nonlimiting examples, the decoder constraint associated with a desired rewind speed may dictate one or more threshold performance values such as a threshold decoder performance value associated with hardware and/or software, etc.

If it is determined that the computing system is not fast enough to obtain all the frames so as to support the requested rewind speed, and/or that the decoder is not fast enough to decode all of the frames so as to support the requested rewind speed, then the stream may be modified at 209 via any suitable approach. For example, this may include thinning the stream by dropping one or more relatively-encoded frames at 210. It should be appreciated that dropping frame(s) at 210 may include instructing the decoder not to decode those frames, and/or instructing the program not to request those frames, if possible. This is because, in some cases, the application may not have the capability to download specific frames, in which case, all frames may be downloaded, just not decoded.

As a nonlimiting example, if it is determined that the system components can support X frames per second, then it may be desirable to limit the number of frames sent to the decoder. For example, if there are more than X frames per second in the video content, dropping relatively-encoded frames at 210 may include dropping B-frames, such that remaining I-frames and P-frames are sent to the decoder since these are not encoded with respect to B-frames. In some embodiments, one or more P-frames may also be dropped. Further, if the desired rewind speed is particularly fast, one or more I-frames may even be dropped.

Alternatively, in some embodiments, the computing system may determine that another version of the stream is available which has a lower complexity than the original stream, which may be received and decoded in a manner that supports the requested rewind speed. In such a case, the computing system may switch from the original stream to the lower-complexity stream, as indicated at 212. The lower-complexity stream may have any suitable parameters resulting in a lower complexity than the original stream, including but not limited to, a lower bitrate, a lower resolution, etc.

Method 200 next proceeds to 214, where the requested frames are acquired from the media source. For the case of the decoder being fast enough to decode all frames within the media at 208, 214 may include requesting all frames within the media. However, for the case that frame(s) of the media were dropped at 210, then frames of the remaining subset of the media are acquired. Or, for the case that the system switched to a lower complexity stream at 212, then frames of the lower complexity stream are acquired. Further, depending on where the media is sourced, 214 may include receiving the frames over a network (e.g., network 108), from mass storage (e.g., mass storage 110), etc.

Upon acquiring the frames of the media which allow the computing system to support smooth rewind playback at the requested rewind speed at 204, method 200 next proceeds to 216, where the GOP boundaries within the acquired media are detected. A GOP boundary typically begins with an independently-encoded frame, such that there are no, or very few, relatively-encoded frames reaching across the GOP boundary. In this way, the frames within the GOP may be decoded without referencing any frames outside of the GOP (e.g., without referencing frames of another GOP) or dropping the pictures with missing references. Further, in some cases, properties of the media may change at the GOP boundaries, such as the picture resolution, the size of allocated frames, etc. The GOP boundaries may be detected at 216 in any suitable way. For example, in some embodiments, the media may include bits that identify the independently-encoded frames directly. In other embodiments, the media may include metadata, such as a media index, which indicates the GOP boundaries.

Method 200 next proceeds to 218, where the picture is decoded. It should be appreciated that the picture may be decoded in any suitable manner such that the frames within a GOP may be decoded in a forward sequential order to account for the dependencies of the relatively-encoded frames. Thus, it should be appreciated that FIG. 2 is illustrative, and 218 may include additional and/or alternative elements without departing from the scope of this disclosure. At 220, a GOP is selected from the plurality of GOP. In particular, this may include selecting the next GOP is a reverse GOP order. This is because a rewinding operation is being performed, and thus, it is desirable to decode a more recent GOP before decoding a less recent GOP, for example.

As an example, each GOP includes frames sequentially ordered in a temporal frame order, such as GOP1 (frame 1, frame 2, . . . , frame 100), GOP2 (frame 101, frame 102, . . . , frame 200), GOP3 (frame 201, frame 202, . . . , frame 300), etc. As such, the GOP are then ordered in a temporal GOP order, namely GOP1, GOP2, GOP3, etc. By selecting a next GOP in a reverse GOP order (e.g., GOP3, GOP2, GOP1, etc.), the frames within the selected GOP may be decoded and displayed in an order suitable for a rewind operation.

Upon selecting the desired GOP, method 200 proceeds to 222 wherein the next frame in the GOP in a forward frame order is selected. In this way, although the GOP are selected in a reverse GOP order, the frames within a GOP are selected in a forward frame order allowing relatively-encoded frames to be properly decoded. As an example, if at 220, GOP3 was selected, then at 222, the next frame in a forward frame order is a next temporally sequential frame of frames 201, 202, . . . , 300. As an example, although an example frame 299 may be relatively-encoded with respect to frames 298 and 297, frame 299 may be properly decoded at 222 since frames 297 and 298 have already been decoded, and thus, all the information needed for decoding frame 299 is available to the decoder.

Upon decoding the next frame in GOP, method 200 next proceeds to 224, where it is determined if the decoded frame is the last frame in the GOP. If it is the last frame in the GOP, then all frames in the GOP have been decoded and cached. In such a case, method 200 proceeds to 226 where all cached decoded frames are displayed (e.g., sent to display pipeline 126 for display at display 128) in a reverse sequential frame order, so as to provide a smooth rewind of the media. The reverse sequential frame order is therefore opposite of the forward sequential frame order in which the frames of the GOP were decoded at 222. For example, in the case of the above-described GOP3, although frames are decoded in a forward sequential frame order at 222 (e.g., frame 201, frame 202, . . . , frame 300), the decoded frames are then displayed in a reverse sequential frame order (e.g., frame 300, frame 299, . . . , frame 201) at 226. Method 200 then returns to 220 to select the next GOP in the reverse GOP order.

However, if it is determined at 224 that the decoded frame is not the last frame in the GOP, then all frames in the GOP are not yet decoded, and method 200 proceeds to 228 where it is determined if there is sufficient memory (e.g., within the computing device) to cache all the frames in the GOP. If there is sufficient memory, the decoded frame is cached into memory at 230. Method 200 then returns to 222 to select a next frame in the GOP in a forward frame order.

However, if it is determined at 228 that there is insufficient memory, then the media may be further thinned, or an output picture may be used, so as to satisfy a memory constraint. As such, method 200 proceeds to 232 where it is determined if there is an output picture available from the display pipeline. For example, a computing device such as computing device 102 of FIG. 1 may be configured to monitor display pipeline 126 which may utilize one or more storage locations 130 of frame cache 124, such as example storage location 130a, when providing cached decoded frames to display 128. In this way, if an output picture is made available by display pipeline 126 (e.g., if a storage location 130 is made available), encoder/decoder 118 may then have sufficient memory to cache the decoded frame. Accordingly, returning to FIG. 2, if an output picture is available at 232, then method 200 proceeds to 234 and uses the output picture. Upon doing so, method 200 returns to 222 to select a next frame in the GOP in a forward frame order.

However, if at 232 no output picture is available, the memory may still be insufficient to cache the frame, and thus, a thinning algorithm may be applied at 236 to the media, and at 238, one or more decoded frames may be selectively overwritten and dropped as a result, with the optimization of smoothness. It should be appreciated that any suitable thinning algorithm may be utilized without departing from the scope of this disclosure. In some embodiments, a thinning rate may be predetermined at the decoder. Further, in some embodiments, the thinning rate may be variable, and may vary, for example, based on output frames received back from the display pipeline. As a nonlimiting example, the thinning rate may drop every other decoded frame. As another nonlimiting example, the thinning rate may be inversely proportional to the amount of caching resources, such that as caching resources decrease the thinning rate increases, and as caching resources increase the thinning rate decreases. Further, in some embodiments, relatively-encoded frames may be dropped and overwritten according to memory and/or display constraints. Upon dropping the decoded frame(s) at 238, method 200 returns to 222 to select a next frame in the GOP in a forward frame order.

It should be appreciated that in some cases, the relatively-encoded frame dropped at 238 may be a reference frame for another relatively-encoded frame in the GOP. As such, at 222, it may be determined that a relatively-encoded frame in the GOP has a missing reference frame, and thus, method 200 may further include dropping a decoding and display of such a frame. In some embodiments, an artifacts and corruptions avoidance setting may be utilized to indicate when to drop the decoding and display of such a relatively-encoded frame missing a reference frame in the GOP (e.g., when the setting is set to a predetermined value indicating that artifacts and corruptions are to be avoided).

It should be appreciated that method 200 is nonlimiting and may include additional or alternative processes not illustrate in FIG. 2. In particular, at 204 method 200 may examine additional or alternative conditions for determining whether or not the computing device has the system resources to perform playback at the desired rewind speed, such as other aspects of decoder performance (hardware or software, memory constraints, bandwidth constraints, a display refresh rate, network/storage performance, etc. Further, with regard to 218, method 200 may utilize various additional or alternative processes for thinning and/or dropping frames when system resources are constrained.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of decoding media playback for smooth rewind playback of streamed media at a desired rewind speed, the media including a plurality of frames, the plurality of frames including a plurality of relatively-encoded frames, a relative encoding for each relatively-encoded frame being dependent on one or more prior frames in the media, the media further including a plurality of independently-encoded frames spaced apart by predefined intervals of relatively-encoded frames, the method comprising:
   receiving a rewind request indicating a rewind speed for rewind playback of the media;
   selectively dropping one or more of the plurality of relatively-encoded frames of the media based on a receipt constraint of receiving the media and a decoding constraint of decoding the media to form a subset of the media;
   receiving the one or more frames of the subset of the media;
   selecting, in a reverse order, a selected group of pictures (GOP) of a plurality of GOP included within the subset of the media, each GOP including at least one independently-encoded frame and one or more relatively-encoded frames;
   decoding each of the one or more relatively-encoded frames of the GOP in a forward sequential frame order;
   caching each of the one or more relatively-encoded frames of the GOP in the forward sequential frame order;
   when caching, dropping and overwriting one or more of the one or more relatively-encoded frames of the GOP selectively according to one or more of a memory constraint and a display constraint; and
   displaying each of the one or more relatively-encoded frames of the GOP in a reverse sequential frame order, the reverse sequential frame order being opposite of the forward sequential frame order.

2. The method of claim 1, wherein the receipt constraint and the decoding constraint indicate one or more threshold performance values determined based on the rewind speed.

3. The method of claim 2, wherein the one or more threshold performance values comprise a threshold network performance value.

4. The method of claim 2, wherein the one or more threshold performance values comprise a threshold storage performance value.

5. The method of claim 2, wherein the one or more threshold performance values comprise a threshold bandwidth value.

6. The method of claim 2, wherein the one or more threshold performance values comprise a threshold decoder performance value.

7. The method of claim 1, further comprising selectively dropping one or more of the plurality of independently-encoded frames of the media based on the receipt constraint and the decoding constraint to form the subset of the media, in addition to selectively dropping the one or more of the plurality of relatively-encoded frames of the media.

8. The method of claim 1, wherein receiving the one or more frames of the subset of the media comprises receiving the one or more frames over a network.

9. The method of claim 1, wherein receiving the one or more frames of the subset of the media comprises receiving the one or more frames from mass storage.

10. The method of claim 1, wherein the media is a first media stream, and wherein the method further comprises, upon receiving the rewind request indicating the rewind speed, selecting a second media stream based on the receipt constraint, the second media stream having a lower complexity than the first media stream.

11. The method of claim 10, wherein the second media stream has a lower bitrate than the first media stream.

12. The method of claim 10, wherein the second media stream has a lower resolution than the first media stream.

13. The method of claim 1, further comprising, when decoding each of the one or more relatively-encoded frames of the GOP, dropping a decoding and display of one or more relatively-encoded frames of the GOP having a missing reference frame in the GOP when an artifacts and corruptions avoidance setting is set to a predetermined value indicating that artifacts and corruptions are to be avoided.

14. A computing device, comprising:
a display configured to visually present media;
a media playback decoder configured to decode media including a plurality of group of pictures (GOP), each GOP including a plurality of relatively-encoded frames, a relative encoding for each relatively-encoded frame being dependent on one or more prior frames in the media, the media further including a plurality of independently-encoded frames spaced apart by predefined intervals of relatively-encoded frames;
a processor configured to execute instructions;
a mass storage device comprising instructions for enabling smooth rewind at a desired rewind speed, the instructions being executable by the processor to:
  receive at the computing device a rewind request indicating a rewind speed for rewind playback of the media;
  selectively drop one or more of the plurality of relatively-encoded frames of the media based on a receipt constraint of receiving the media and a decoding constraint of the media playback decoder to form a subset of the media having one or more frames;
  receive the one or more frames of the subset of the media;
  for each GOP within the subset of the media selected in a reverse sequential GOP ordering:
    decode each of a plurality of relatively-encoded frames associated with the GOP in a forward sequential frame order;
    cache each of the plurality of relatively-encoded frames associated with the GOP in the forward sequential frame order;
    when caching, drop and overwrite one or more of the plurality of relatively-encoded frames of the GOP selectively according to one or more of a memory constraint of the processor and a display constraint of the display; and
    display each of the plurality of relatively-encoded frames associated with the GOP in a reverse sequential frame order, the reverse sequential frame order being opposite of the forward sequential frame order.

15. The computing device of claim 14, wherein the instructions are further executable to drop a decoding and display of one or more relatively-encoded frames of the GOP having a missing reference frame in the GOP when an artifacts and corruptions avoidance setting is set to a predetermined value indicating that artifacts and corruptions are to be avoided.

16. The computing device of claim 14, wherein the receipt constraint and the decoding constraint indicate one or more threshold performance values determined based on the rewind speed.

17. The computing device of claim 14, wherein the instructions are executable to receive the one or more frames of the subset of the media by receiving the one or more frames from one of a network and the mass storage device.

18. A method of decoding media playback for smooth rewind playback of streamed media at a desired rewind speed, the media including a plurality of frames, the plurality of frames including a plurality of relatively-encoded frames, a relative encoding for each relatively-encoded frame being dependent on one or more prior frames in the media, the media further including a plurality of independently-encoded frames spaced apart by predefined intervals of relatively-encoded frames, the method comprising:
receiving a rewind request indicating a rewind speed for rewind playback of a first stream of the media;
selecting a second stream of the media based on a threshold value of receiving the media, the threshold value based on the rewind speed, the second stream of the media having a lower complexity than the first stream of the media;
receiving the one or more frames of the second stream of the media;
selecting, in a reverse order, a selected group of pictures (GOP) of a plurality of GOP included within the second stream of the media, each GOP including at least one independently-encoded frame and one or more relatively-encoded frames;
decoding each of the one or more relatively-encoded frames of the GOP in a forward sequential frame order;
caching each of the one or more relatively-encoded frames of the GOP in the forward sequential frame order;
when caching, dropping and overwriting one or more of the one or more relatively-encoded frames of the GOP selectively according to one or more of a memory constraint and a display constraint; and
displaying each of the one or more relatively-encoded frames of the GOP in a reverse sequential frame order, the reverse sequential frame order being opposite of the forward sequential frame order.

19. The method of claim 18, wherein the second stream of the media has a lower bitrate than the first stream of the media.

20. The method of claim 18, wherein the second stream of the media has a lower resolution than the first stream of the media.

* * * * *